US009122998B2

(12) United States Patent
Boudreau et al.

(10) Patent No.: US 9,122,998 B2
(45) Date of Patent: Sep. 1, 2015

(54) CATALOG-BASED SOFTWARE LICENSE RECONCILIATION

(75) Inventors: Michael K. Boudreau, Orange, CA (US); Jamie B. Marsnik, Minneapolis, MN (US); Bradley T. Moore, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/845,227

(22) Filed: Jul. 28, 2010

(65) Prior Publication Data

US 2012/0030072 A1   Feb. 2, 2012

(51) Int. Cl.
| | | |
|---|---|---|
| G06F 11/30 | (2006.01) | |
| G06F 12/14 | (2006.01) | |
| G06Q 10/00 | (2012.01) | |
| G06Q 40/00 | (2012.01) | |
| G07B 17/00 | (2006.01) | |
| G07F 19/00 | (2006.01) | |

(52) U.S. Cl.
CPC ............... *G06Q 10/00* (2013.01); *G06Q 40/12* (2013.12)

(58) Field of Classification Search
CPC ................................. G06F 21/72; G06F 21/10
USPC .............................................. 705/30; 713/189
See application file for complete search history.

(56) References Cited

U.S. PATENT DOCUMENTS

| | | | |
|---|---|---|---|
| 6,029,145 A | 2/2000 | Barritz et al. | |
| 6,810,389 B1 * | 10/2004 | Meyer .............................. | 705/59 |
| 7,069,595 B2 | 6/2006 | Cognigni et al. | |
| 7,516,090 B2 | 4/2009 | Agarwal | |
| 7,676,437 B2 | 3/2010 | Satkunanathan et al. | |
| 7,831,956 B2 * | 11/2010 | Kimmerly ...................... | 717/113 |
| 8,359,566 B2 | 1/2013 | Chaar et al. | |
| 8,489,920 B2 * | 7/2013 | Rippingale ..................... | 714/15 |
| 2002/0111922 A1 | 8/2002 | Young et al. | |
| 2002/0169625 A1 | 11/2002 | Yang et al. | |
| 2003/0023966 A1 * | 1/2003 | Shimizu et al. ............... | 717/175 |
| 2003/0028786 A1 * | 2/2003 | Mustafa ........................ | 713/189 |
| 2004/0225524 A1 | 11/2004 | Narasimhan et al. | |
| 2004/0249756 A1 * | 12/2004 | Garibay et al. ................. | 705/51 |
| 2005/0086174 A1 * | 4/2005 | Eng ................................. | 705/59 |
| 2005/0102240 A1 * | 5/2005 | Misra et al. ..................... | 705/59 |

(Continued)

OTHER PUBLICATIONS

U.S. Appl. No. 12/845,420, Office Action, Mar. 9, 2012, 13 pages.
U.S. Appl. No. 12/845,420, Final Office Action, Jul. 2, 2012, 11 pages.
U.S. Appl. No. 12/845,420, Office Action, Jun. 30, 2014, 16 pages.
U.S. Appl. No. 12/845,420, Office Action, Sep. 18, 2014, 19 pages.

(Continued)

*Primary Examiner* — Seye Iwarere
(74) *Attorney, Agent, or Firm* — John R. Pivnichny; Keohane & D'Alessandro PLLC; Madeline F. Schiesser (57) ABSTRACT

A software reconciliation engine utilizes a software rule-based catalog to produce accurate license reconciliation across a wide range of software configurations. A software offering may comprise software installables and corresponding constraints. Installed software and active hardware is discovered by a scanner, stored in an installed software database and active hardware database respectively and is mapped against entitled software offerings to determine whether the installed software is entitled to be installed on the hardware. The installed software has a base product attribute, a used-in-count attribute and a parent-child attribute that are used by the reconciliation engine to compare against the constraints to determine entitlement and report compliance.

15 Claims, 9 Drawing Sheets

(56) References Cited

U.S. PATENT DOCUMENTS

| | | | |
|---|---|---|---|
| 2005/0216420 A1* | 9/2005 | Padole et al. | 705/59 |
| 2006/0073890 A1* | 4/2006 | McAllister et al. | 463/29 |
| 2007/0043679 A1 | 2/2007 | Le et al. | |
| 2007/0061799 A1* | 3/2007 | Kimmerly | 717/168 |
| 2007/0240154 A1 | 10/2007 | Gerzymisch et al. | |
| 2007/0245235 A1 | 10/2007 | Singh et al. | |
| 2007/0294179 A1 | 12/2007 | Krawetz | |
| 2008/0243629 A1 | 10/2008 | Chang et al. | |
| 2008/0320607 A1* | 12/2008 | Richardson | 726/33 |
| 2009/0098936 A1* | 4/2009 | Lawrence et al. | 463/29 |
| 2009/0158438 A1 | 6/2009 | Pichetti et al. | |
| 2009/0228984 A1 | 9/2009 | Sterin | |
| 2009/0248428 A1* | 10/2009 | Disciascio et al. | 705/1 |
| 2010/0100778 A1* | 4/2010 | Sullivan | 714/57 |
| 2012/0030072 A1* | 2/2012 | Boudreau et al. | 705/30 |

OTHER PUBLICATIONS

U.S. Appl. No. 12/845,420, Notice of Allowance, Mar. 11, 2015, 17 pages.
IBM, "Software Inventory Validation Tool", IP.com No. IPCOM000175050D, Oct. 3, 2008, 3 pages.
Authors et al.: Disclosed Anonymously, "Method to check software license compliance in virtualized environments", IP.com No. IPCOM000195549D, May 5, 2010, 5 pages.
John Cronin et al., "System for Tracking and Enforcing Software Licenses", IP.com No. IPCOM000180768D, Mar. 16, 2009, 6 pages.
IBM, "Licensing of pricing models with flexible characteristics", IP.com No. IPCOM000143165D, Nov. 14, 2006, 4 pages.

* cited by examiner

Figure 7 – Reconciliation Process 700

Figure 8 – Linked Entitlement Process 800

CATALOG-BASED SOFTWARE LICENSE RECONCILIATION

CROSS-REFERENCE TO RELATED APPLICATIONS

This patent application is related to the commonly owned and co-pending patent application entitled "CREATION AND USE OF CONSTRAINT TEMPLATES", filed on Jul. 28, 2010, having Ser. No. 12/845,420, and which is hereby incorporated by reference in its entirety for all purposes.

FIELD OF THE INVENTION

Aspects of the present invention provides for a method and a system for software license reconciliation utilizing a software rule-based catalog that is used by a reconciliation engine in order to improve the accuracy of the reconciliation results.

BACKGROUND OF THE INVENTION

Many products exist today that reconcile software licenses to discovered software. However, current reconciliation engines fall short of delivering an accurate reconciliation for the following reasons. First, current methods do a poor job of recognizing that most licenses entitle one to install and/or use a set of software programs, not just a single program Second, current methods do not distinguish between those discovered installed entitled programs that should decrease the license pool from those that should not. Third, while some reconciliation engines embody the concept of program bundling, they miss the important relationships of the bundled program to the rest of the entitled software programs. Fourth, current methods miss the pervasive reuse of code that goes beyond the bundled program. Finally, current methods do not provide a way of distinguishing between enabled and/or functional installations and unusable and/or nonfunctional installations of software programs.

SUMMARY OF THE INVENTION

The present invention may comprise a software reconciliation engine that utilizes a software rule-based catalog to produce accurate license reconciliation across a wide range of software configurations. This rule-based approach provides powerful advantages to software license management, including labor savings through automatic reconciliation, and cost savings through accurate license calculations, software reuse and bundle handling, cost optimization and identification of unusable software installations.

The present invention may comprise a method of reconciling discovered software programs with software licenses in a computer environment having hardware comprising, providing a rule-based catalog for mapping an entitled software offering having software programs and associated constraints to installed software programs, at least one constraint comprising an entitled installation count specifying the number of entitled installations of the software programs for the software offering, discovering software programs installed on the hardware in the computer environment, the installed software programs each having a base product attribute, a used-in-counts attribute and a parent-child attribute, each of the attributes being set or reset, identifying an entitled software offering associated with a discovered installed software program and fetching all other installed software programs in the identified software offering, determining if one or more of the discovered installed software programs in the identified entitled software offering has its base product attribute set to determine if the one or the discovered software programs in the identified entitled software offering is a base product and if one or more of the discovered software programs in the identified entitled software offering is not a base product, not counting the identified entitled software offering against the entitled installation count.

The present invention may further comprise a computer-readable medium storing computer instructions, which, when executed, enables a computer system operating with a reconciliation engine, a software license offering catalog, an active hardware database, entitlement constraint database and an installed hardware database for reconciling discovered software programs with entitled software licenses in a computer environment having hardware comprising, providing a rule-based catalog for mapping an entitled software offering having software programs and associated constraints to installed software programs, at least one constraint comprising an entitled installation count specifying the number of entitled installations of the software programs for the software offering, discovering software programs installed on the hardware in the computer environment, the installed software programs each having a base product attribute, a used-in-counts attribute, and a parent-child attribute, each of the attributes being set or reset, identifying an entitled software offering associated with a discovered installed software program and fetching all other installed software programs in the identified software offering and if one or more of the discovered software programs in the identified entitled software offering is not a base product, not counting the identified entitled software offering against the entitled installation count.

The present invention may further yet comprise a method for deploying a software license reconciliation engine server for use in a computer system for reconciling discovered software programs with entitled software licenses in a computer environment having hardware, comprising providing a computer infrastructure operating with a reconciliation engine, software license offering catalog, an active hardware database, entitlement constraint database and an installed hardware database, the computer infrastructure operable to provide a rule-based catalog for mapping an entitled software offering having software programs and associated constraints to installed software programs, at least one constraint comprising an entitled installation count specifying the number of entitled installations of the software programs for the software offering, discover software programs installed on the hardware in the computer environment, the installed software programs each having a base product attribute, a used-in-counts attribute, and a parent-child attribute, each of the attributes being set or reset, identify an entitled software offering associated with a discovered installed software program and fetching all other installed software programs in the identified software offering, determine if one or more of the discovered installed software programs in the identified entitled software offering has its base product attribute set to determine if the one or the discovered software programs in the identified entitled software offering is a base product, if one or the discovered software programs in the identified entitled software offering is a base product, determine if one or more of the discovered software programs in the identified entitled software offering has its used-in-counts attribute set, determine if there is a relationship between the discovered software program and the fetched all other installed software programs, and, if one or more of the discovered software programs in the identified entitled software offering has its used-in-counts attribute set and further based upon the relationship determination to identify a required installation count, determine if there are sufficient entitled installations in the entitled installation count to cover the required installation count and, if so, report the discovered software program in the software offering as installation compliant and, if not, report the discovered software program in the software offering as installation non-compliant.

The present invention may further comprise a software license reconciliation engine server for reconciling discovered software programs with entitled software licenses in a computer environment having hardware comprising a scanner for discovering software programs installed on the hardware in the computer environment, the installed software programs each having a base product attribute, a used-in-counts attribute, and a parent-child attribute, each of the attributes being set or reset, a reconciliation engine for identifying an entitled software offering stored in an software license offering catalog associated with a discovered installed software program and fetching all other installed software programs in the identified software offering and determining if one or more of the discovered installed software programs in the identified entitled software offering has its base product attribute set to determine if the one or the discovered software programs in the identified entitled software offering is a base product and, if one or the discovered software programs in the identified entitled software offering is a base product, determining if one or more of the discovered software programs in the identified entitled software offering has its used-in-counts attribute set, determining if there is a relationship between the discovered software program and the fetched all other installed software programs and, if one or more of the discovered software programs in the identified entitled software offering has its used-in-counts attribute set and further based upon the relationship determination to identify a required installation count, determining if there are sufficient entitled installations in the entitled installation count to cover the required installation count and, if so, reporting the discovered software program in the software offering as installation compliant and, if not, reporting the discovered software program in the software offering as installation non-compliant, software license offering catalog for storing an entitled software offering having software programs and associated constraints to installed software programs, at least one constraint comprising an entitled installation count specifying the number of entitled installations of the software programs for the software offering, an active hardware database for storing data related to active hardware in the computer environment, entitlement constraint database for storing entitlement constraints related to software offerings stored in the software license offering catalog, and an installed software database for storing data related to the discovered software programs installed on the hardware in the computer environment discovered by the scanner.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The invention utilizes a rule-based software catalog to perform reconciliation. A rule-based software catalog is a relationship mapping of two entities: a software product offering comprising software code and corresponding constraint (license terms) and the actual code artifacts (software installed code) that is detected by a software scanner together with the properties of the discovered code. The catalog tracks the installation of software programs to ensure recognition of reuse. The reconciliation process utilizes three attributes that are set (set to "1" or "yes") or reset (reset to "0" or "no") in the code artifacts when the entitlement constraints are entered, a used-in-counts attribute, a base product attribute, and a parent-child attribute. A software product offering is listed in the catalog for selection by, e.g., a software license analyst for purchase/licensing. Once a software product offering has been purchased/licensed, the artifacts of the software product offering are installed with the attributes appropriately set or reset and the constraint/license portion of the software product offering becomes an active software license to be recognized by the reconciliation engine. A software program is listed in the catalog and is associated with a hardware device by the software discovery routine.

Software licenses define, among other things, the right to install and/or use software programs. A software program should be considered as installed if the software program exists on a system and appears to be able to execute. During software migrations and upgrades, immaterial and/or non-functional software programs can be left behind on systems. The catalog rules address the immaterial software programs found on the system.

Figure 1:
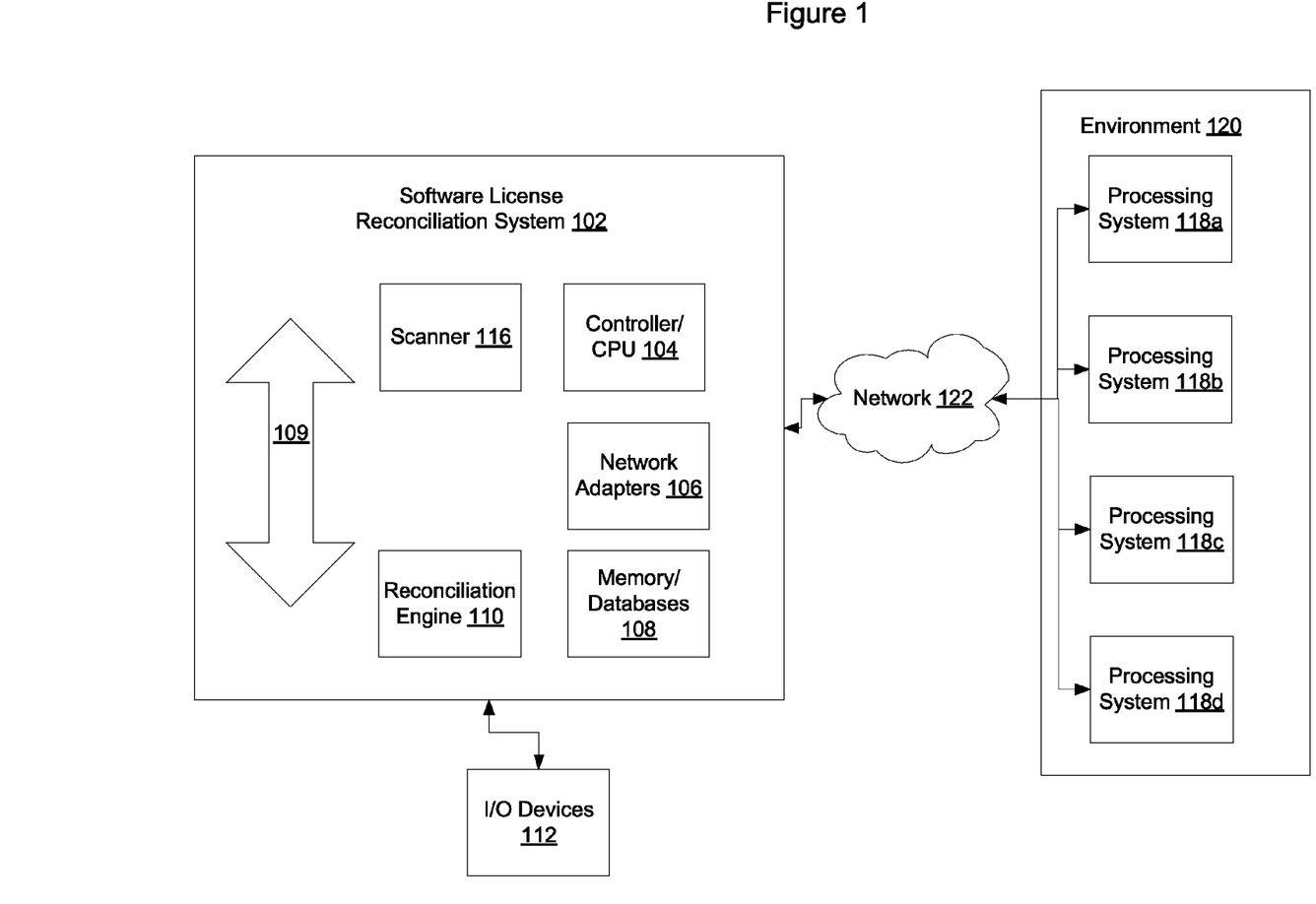
FIG. 1 shows a system having an embodiment of the software license reconciliation system for providing accurate license reconciliation across a wide range of software configurations of the present invention.

As shown in FIG. 1, System 100 for implementing the system and method of the present invention may have Software License Reconciliation System 102, suitable for storing and/or executing Software License Reconciliation program code of the present invention, connected to Environment 120, perhaps through one or more intervening networks (Network 122). Software License Reconciliation System 102 may include at least one processor (Controller/CPU 104) coupled directly or indirectly to Memory/Databases 108 and to other components within Software License Reconciliation System 102 through System Bus 109. Memory/Databases 108 may include local memory (RAM) employed during actual execution of the Software License Reconciliation program code and cache memories that provide temporary storage of at least some program code in order to reduce the number of times code must be retrieved from bulk storage. Memory/Databases 108 may include a software license catalog, an entitlement constraint database, an active hardware database and an installed hardware database to be discussed in greater detail below. Input/output or I/O Devices 112 (including but not limited to keyboards, displays, pointing devices, etc.) may be used to communicate with Software License Reconciliation System 102. Scanner 116 may be used to scan Processing Systems 118a, 118b, 118c, 118d in Environment 120 to identify active hardware and installed software in Processing Systems 118a, 118b, 118c, 118d for storage in Memory/Databases 108 (i.e., in active hardware database and in installed hardware database). Scanner 116 may access Processing Systems 118a, 118b, 118c, 118d through the one or more intervening networks (Network 122) using Network Adapters 106. Reconciliation Engine 110 may be utilized to reconcile entitled software with active hardware and installed software discovered by Scanner 116 to be discussed in greater detail below.

Figure 2:
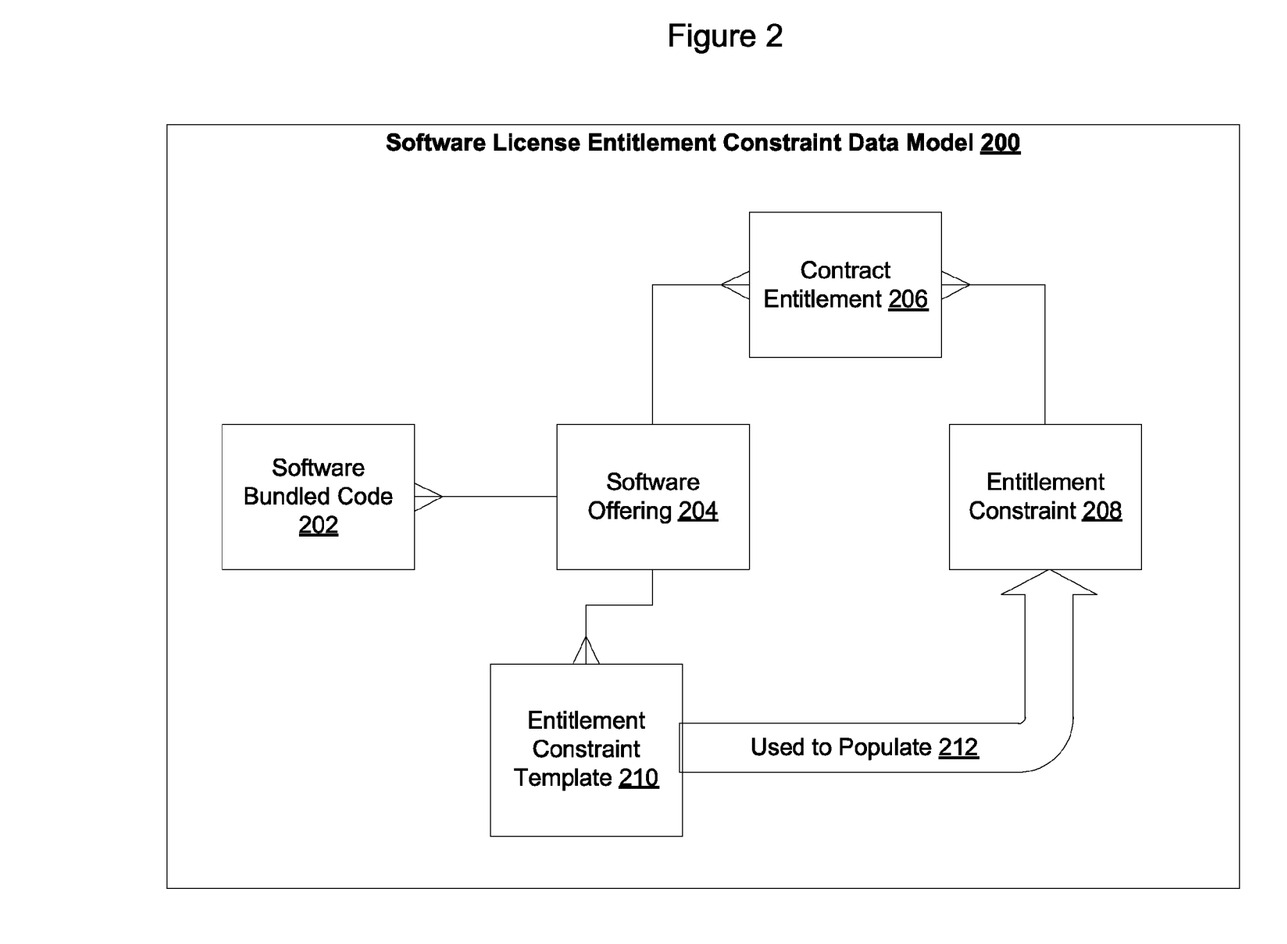
FIG. 2 shows a software license entitlement constraint data model of an embodiment of the present invention.

FIG. 2 illustrates Software License Entitlement Constraint Data Model 200. Software Offering 204 may consist of software artifacts, that is, software installables, which may be selected and purchased/licensed to be installed on a machine, and accompanying license terms (constraints) associated with the software artifacts. For example, the software artifacts may be offered as Software Bundled Code 202 and may have entitlement constraints as entered through Entitlement Constraint Template 210 by, for instance, a contract manager. Constraints may comprise physical (hardware) constraints and/or environmental constraints. This will be discussed in greater detail below. The entered entitlement constraints may be uploaded via Used to Populate path 212 to Entitlement Constraint database 208. Contract Entitlement 206 defines the entitlement provided when a software offering is selected and purchased/licensed by, for example, a software analyst.

Figure 3:
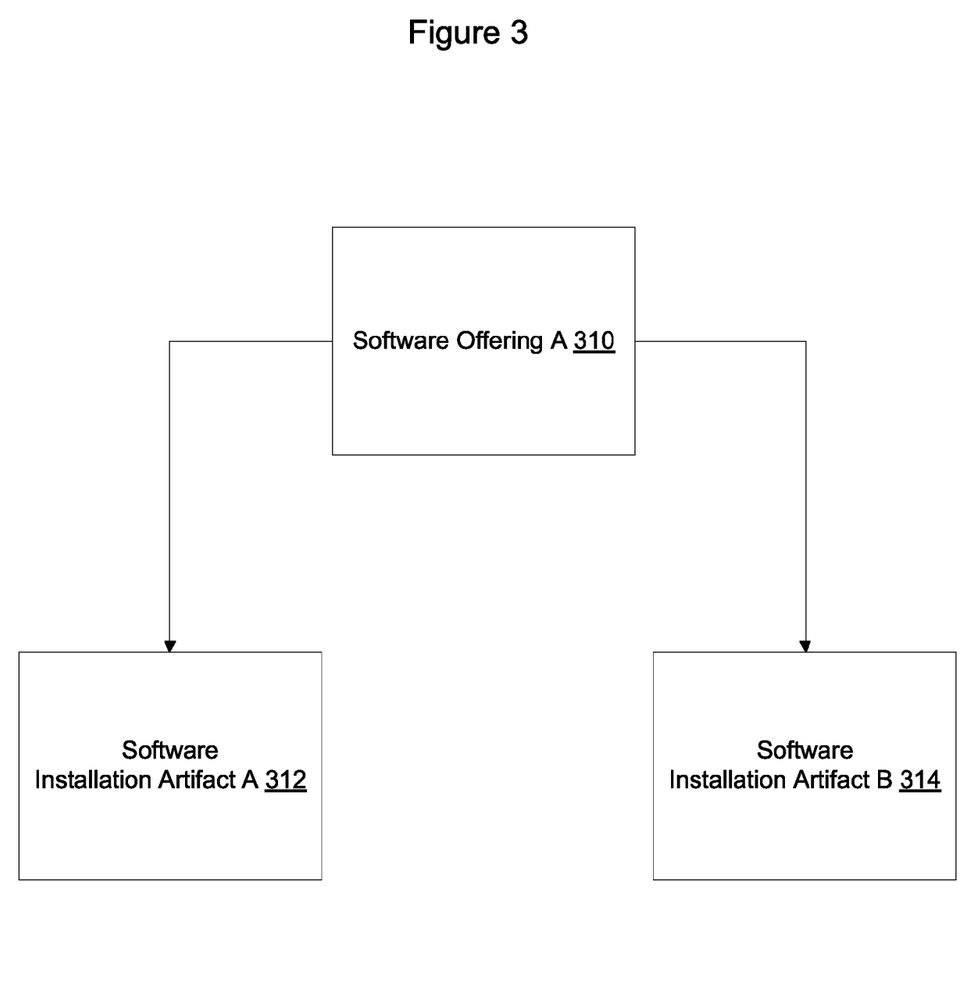
FIG. 3 is a diagram illustrating the logical hierarchy for software license catalog compliance.

FIG. 3 is a diagram illustrating the hierarchy for software license catalog compliance 300. Software Offering A 310 may comprise the actual software to be installed (software artifacts) and the license terms (constraints) that go with Software Offering A 310. For example, the license terms (constraints) to Software Offering A may be that the artifacts are bundled, unbundled, tied to a particular machine (physical constraint), to be used only in development or in staging/production (environmental constraint) or may relate to counting, that is, having an entitled installation count specifying the number of entitled installations of the software programs for the software offering or a number of copies authorized. With regard to counting, some artifacts should be counted and some others not. For instance, if Software Offering A 310 is a bundled product, the entitled bundled product and all its artifacts may count as a single count. That is, one artifact of the bundled product is a base product and is used in the count. (It has its base product and used-in-count attributes set to "1".) If one artifact is dependent upon another artifact, the artifacts may have a parent-child relationship so that only one count is used for both artifacts. The parent artifact has its parent-child attribute set to "1" and its used-in-count attribute set to "1" while the child artifact is the "not used in counts" product, having its parent-child attribute reset to "0" and its "used-in-counts" attribute reset to "0".

These constraints are input into the software catalog by a contract manager generally upon making the software offering available in the software catalog. Software Offering A, when selected by a software license analyst and installed, produces Software Installation Artifact A 312 as a Base Product (base product attribute set to "1" and "used-in-counts" attribute set to "1") and Software Installation Artifact B 314 as a "Not used in Counts" Product ("used-in-counts" attribute reset to "0"). Software Installation Artifact B 314, in this example, depends upon Software Installation Artifact A 312 so has a child-parent relationship with Software Installation Artifact A 312. As such, Software Installation Artifact A 312 has its parent-child attribute set to "1" while Software Installation Artifact B 314 has its parent-child attribute reset to "0".

Figure 4:
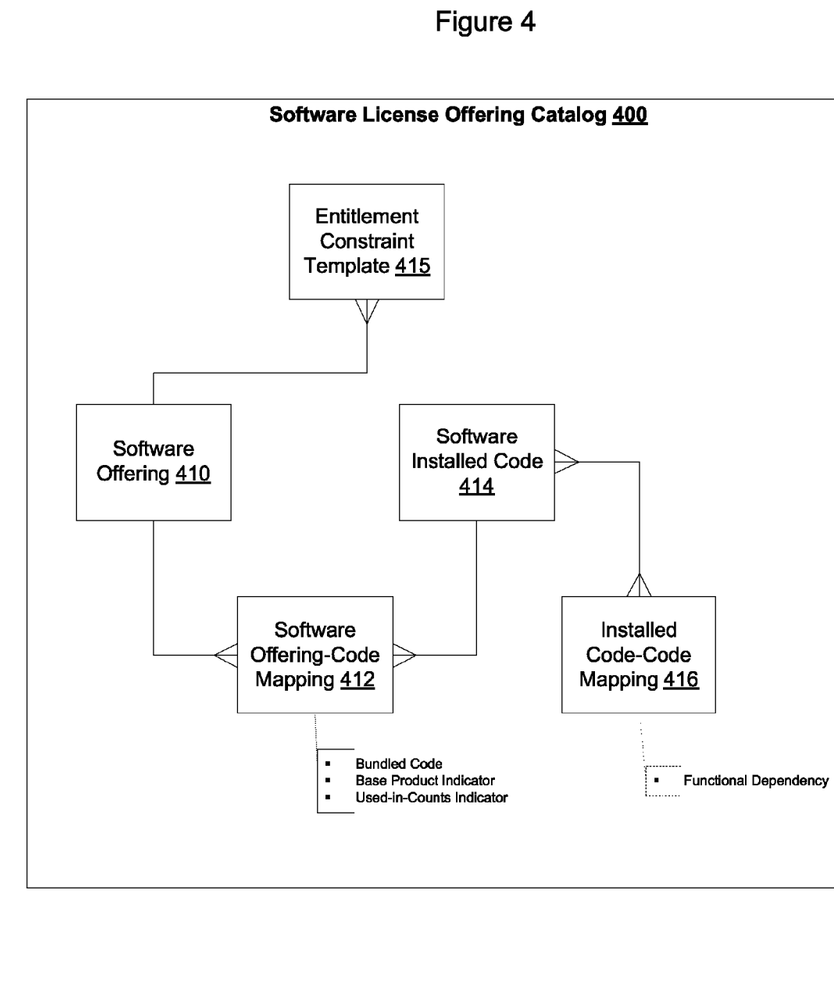
FIG. 4 is a diagram illustrating a logical model of a software license offering catalog.

FIG. 4 is a high-level diagram illustrating the logical model of Software License Offering Catalog 400 and how it works. Software Offering 410 has, as noted above, the software artifacts and constraints associated with the artifacts. Software Installed Code 414 is the identified installed code (artifacts). Software Installed Code 414 in the environment is identified through the use of a scanner, e.g., such as IBM® Tivoli® Monitoring software. IBM and Tivoli are registered trademarks of International Business Machines Corporation. Installed code-Code Mapping 416 maps Software Installed Code 414 that have functional dependency, that is, one artifact has a functional dependency upon another (i.e., parent-child relationship). Software Offering-Code Mapping 412 maps entitled Software Offering 410 to Software Installed Code 414. The mapping may comprise identifying bundled code, base product indicators and used-in-count indicators.

Figure 5:
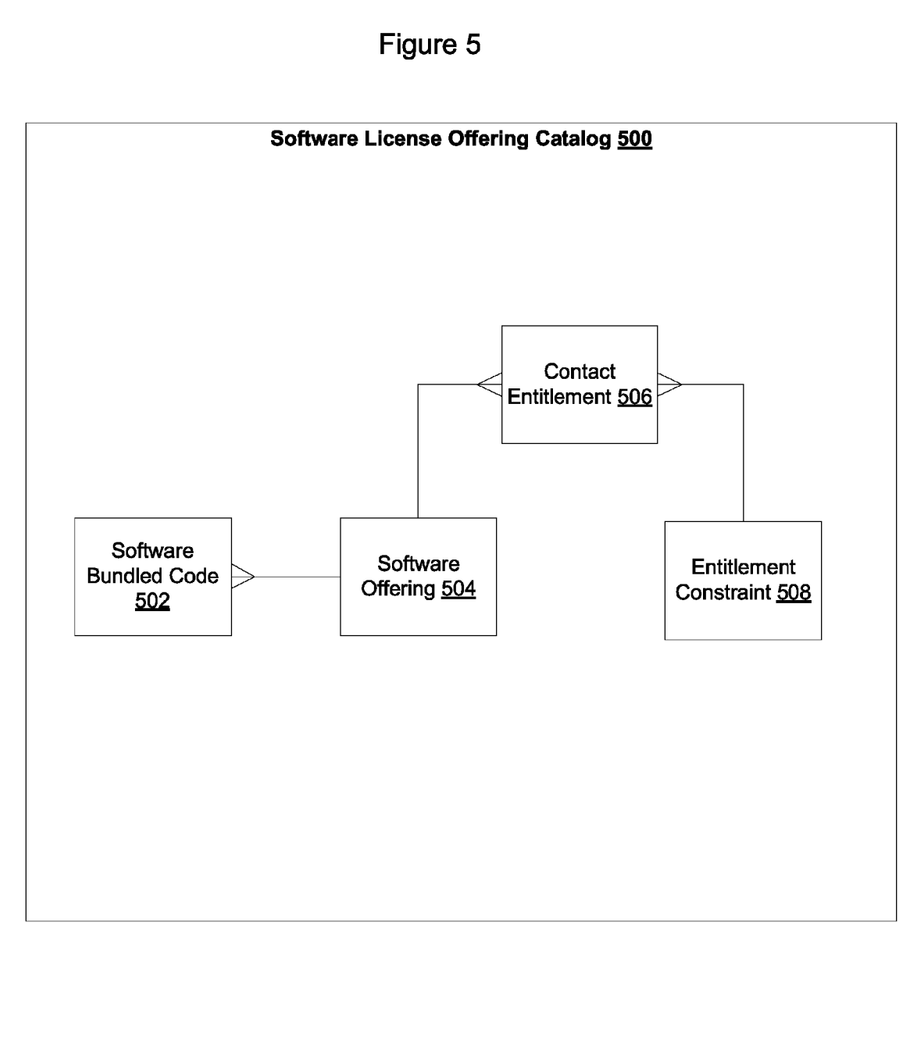
FIG. 5 is a second diagram illustrating the logical model of the software license offering catalog.

FIG. 5 is a diagram illustrating a model of Software License Offering Catalog 500 of the present invention. Software Offering 504 may have constraints, e.g., bundled code, such that it is Software Bundled Code 502. Once selected and purchased by, for example, a software license analyst, Software Offering 500 has Contract Entitlement 506, that is, the purchaser/licensee is entitled to utilize Software Offering 500, subject to Entitlement Constraint 508.

Figure 6:
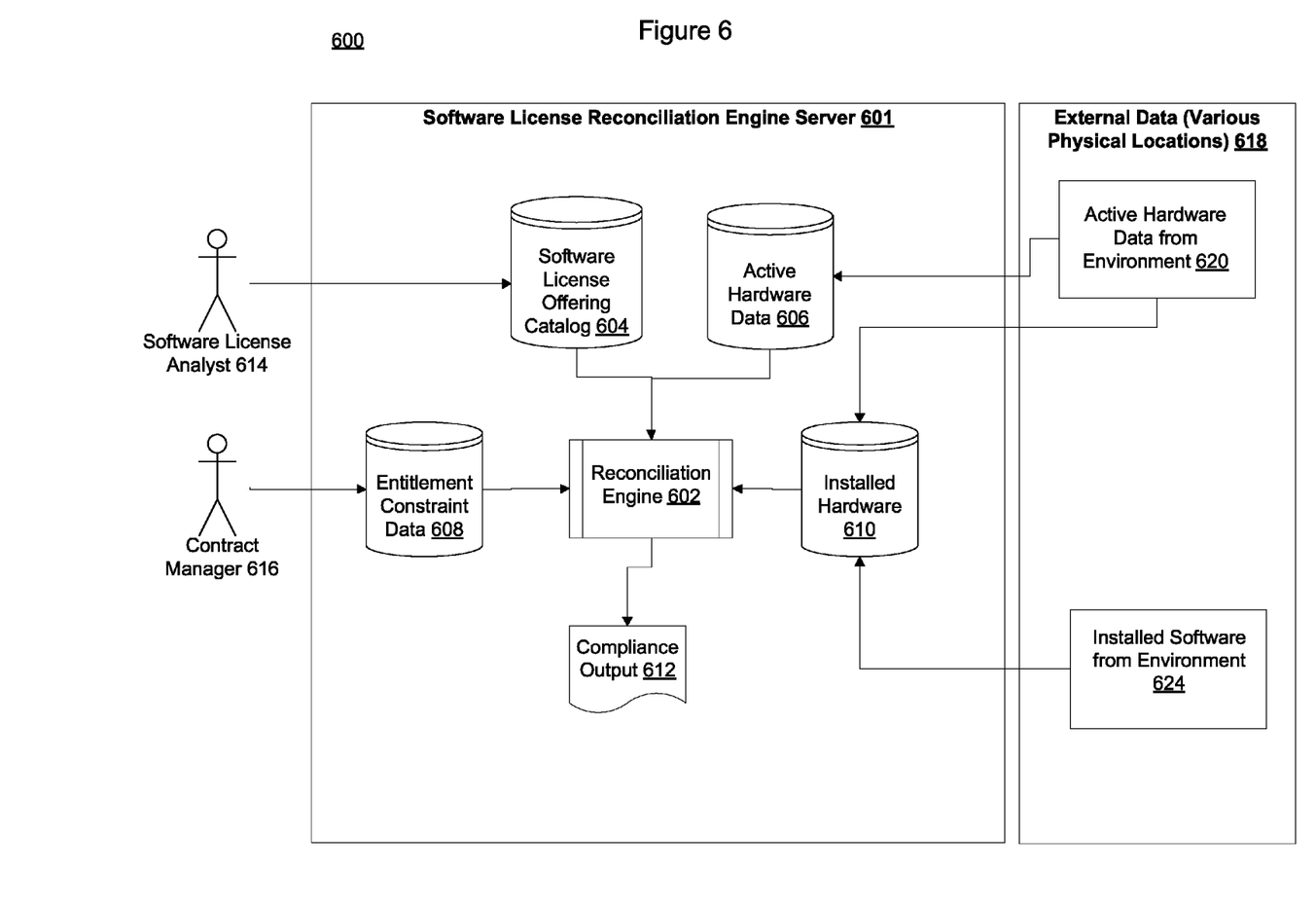
FIG. 6 illustrates an embodiment of a software license reconciliation system of the present invention.

FIG. 6 illustrates Software License Reconciliation System 600 of the present invention having a Software License Reconciliation Engine Server 601 and External Data 618 perhaps stored in various physical locations. Software License Reconciliation Engine Server 601 has Software License Offering Catalog database 604 for storing a software license offering catalog, an Active Hardware Data database 606 for storing discovered active hardware data, Entitlement Constraint Data database 608 for storing entitlement constraint data, Installed Software database 610 for storing discovered, installed software data and Reconciliation Engine 602 for receiving inputs from these sources and providing Compliance Output 612.

External Data 618 provides Active Hardware Data database 606 with discovered active hardware date from Environment 620 identifying all of the discovered active hardware in the environment. Active hardware is identified using, for example, a hardware scanner. One example of a hardware scanner is IBM Tivoli Monitoring 6.1 software. Installed Software from Environment 624 provides all installed software as identified by, for instance, a software scanner, to Installed Software database 610.

Software License Analyst 614 accesses Software License Offering Catalog database 604 for selecting and purchasing/licensing software offerings for installation/use in the environment (Environment 120, FIG. 1). The appropriate attributes are set or reset and the artifacts from the licensed software offerings are installed in the environment and, subsequently, detected by, for example, a scanner and are uploaded to Installed Software database 610.

Contract Manager 616 accesses Entitlement Constraint database 608 for entering the entitlement constraints on the software offerings. This is generally done when the software offering is made available on Software License Offering Catalog 604.

Reconciliation Engine 602 receives inputs from Software License Offering Catalog 604, Active Hardware Data database 606, Installed Software database 610, and Entitlement Constraint Data database 608 for, among other things, determining which of the installed software are entitled and which are not and producing Compliance Output 612.

Figure 7:
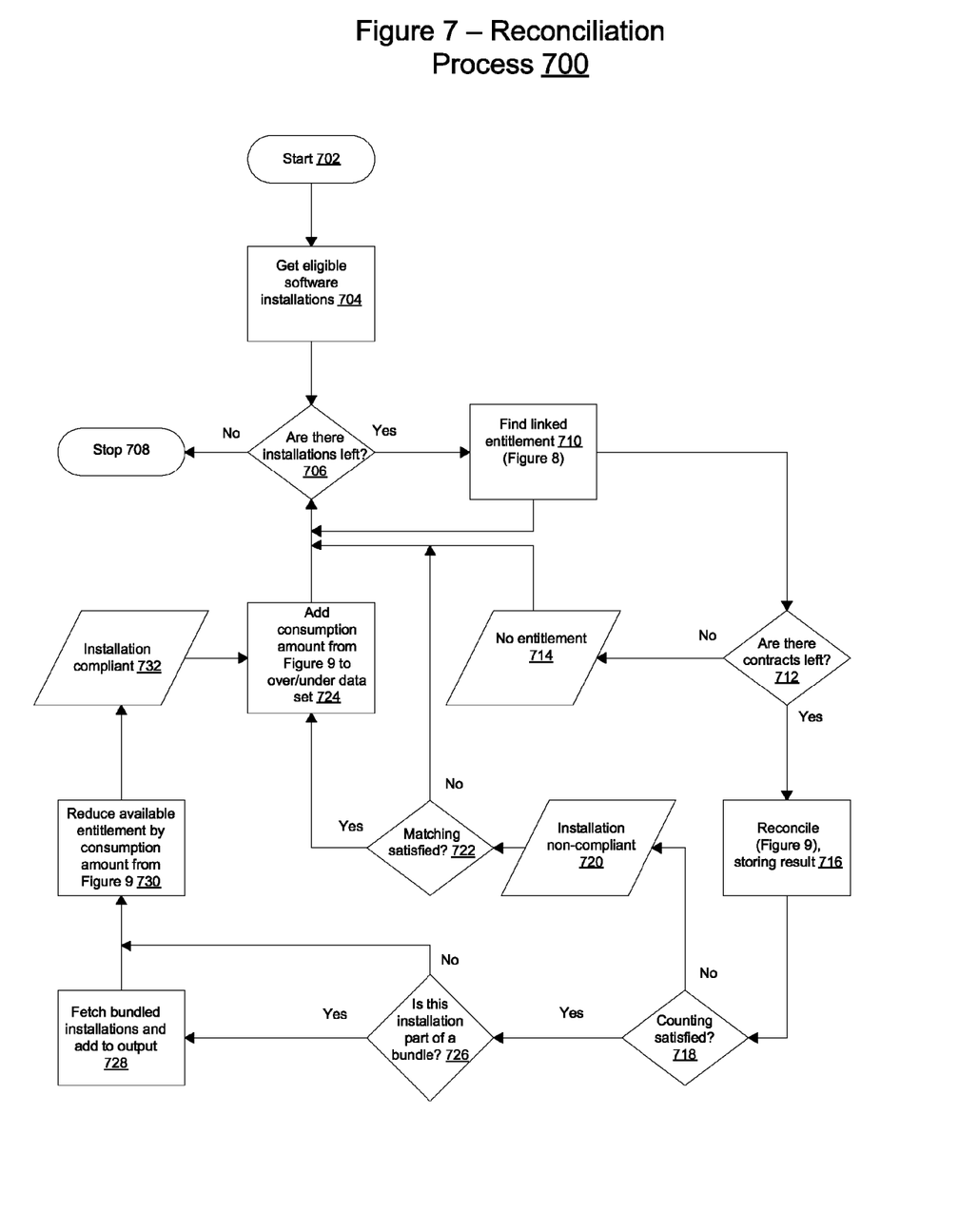
FIG. 7 illustrates one embodiment of a reconciliation process of the present invention.
Figure 8:
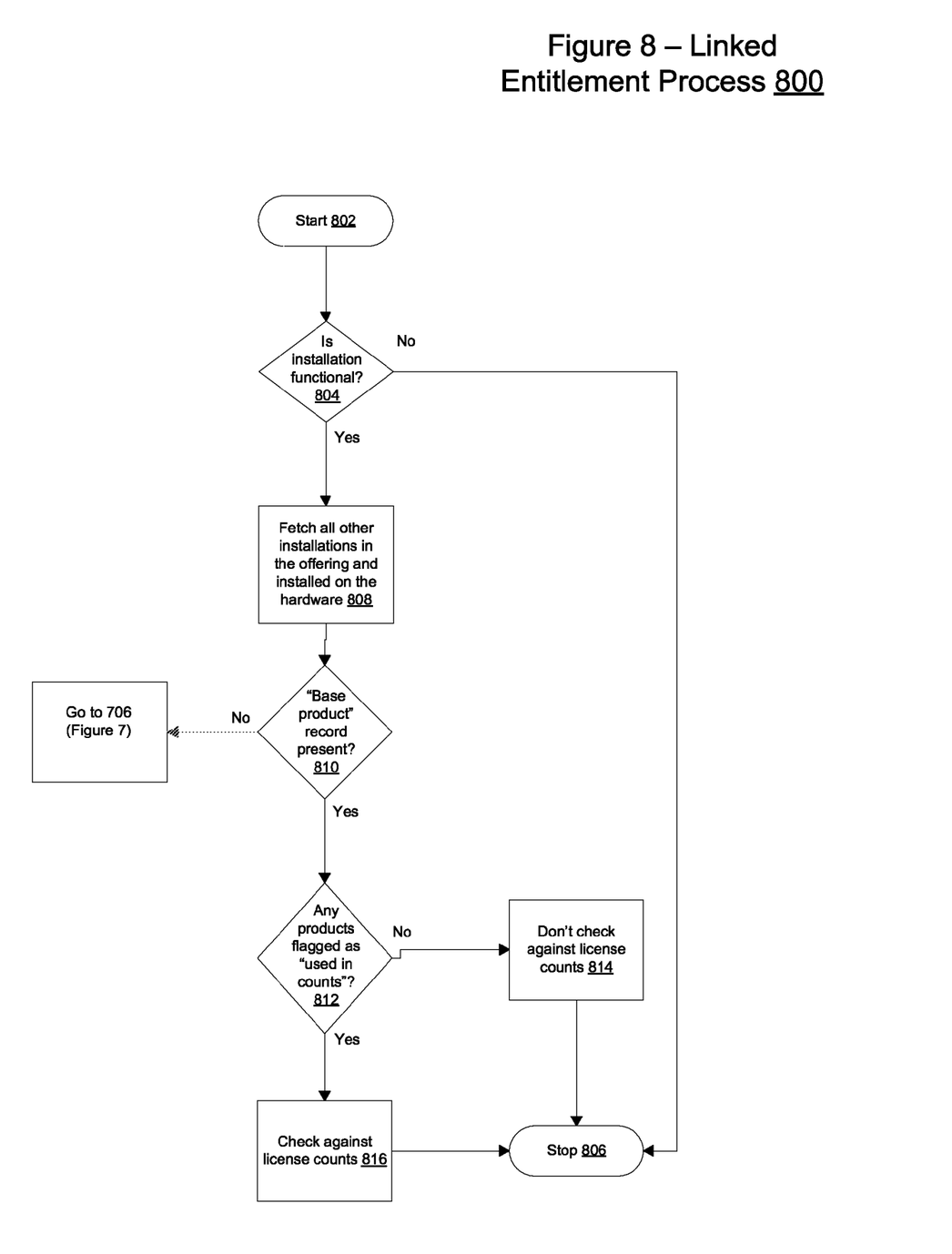
FIG. 8 illustrates one embodiment of a linked entitlement process of the present invention.
Figure 9:
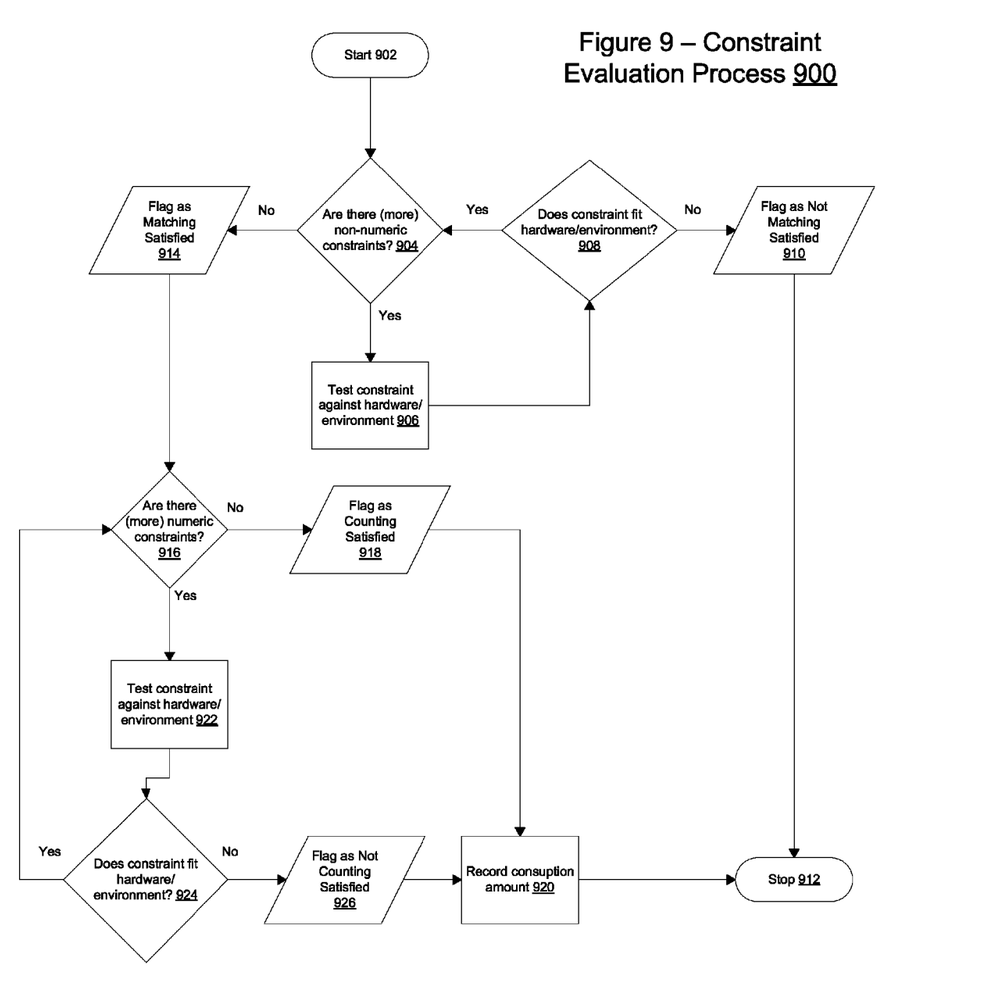
FIG. 9 illustrates one embodiment of a constraint evaluation process of the present invention.

As shown in FIGS. 7, 8 and 9 to be discussed below, Reconciliation Engine 602 gathers all of the active hardware data from Active Hardware Data database 606 and software programs from Installed Software database 610 that are mapped to each distinct software offering in Software License Offering Catalog 604 into what are called "entitled programs". From the entitled program grouping, the rules-based Software License Offering Catalog 604 identifies any special relationships, such as bundling or a parent-child relationship, between the software programs. A first test is applied to ensure that a base product exists, that is, for instance, a discovered artifact has the base product attribute set to "1". In some cases, Reconciliation Engine 602 will evaluate a single system or environment and in other cases the entire set of systems or environments. In other words, Reconciliation Engine 602 ensures that the material programs (from Installed Software database 610) exist and there is confidence that the software program (artifact) is, in fact, installed and able to execute. This step ensures that there is a situation that needs licensing.

In a second step, Reconciliation Engine 602 looks for a bundled relationship between the entitled programs. A bundled relationship is where one program that is entitled is relationship. An "installation bundle" is the subset of software programs that have been flagged as parent-child in the catalog. When these two software programs are found to be installed on the same system, the child software program is considered licensed via the parent program.

Links between hardware devices (from Active Hardware Data database 606) and licenses (from Software License Offering Catalog 604) are established. Once a link between a hardware device and a license is established, Reconciliation Engine 602 then determines whether or not the license has capacity for the software installation. If the "used-in-counts" bit is set on, or to "1" or to "yes", for at least one code installation in an offering bundle, then the entitled installation count specifying the number of entitled installations of the software programs for the software offering will be decreased when reconciliation occurs. Reconciliation Engine 602 subtracts the used counts of entitlement available for the given license and adds the record of the code artifact to an internal table of code artifacts that are already processed.

Reconciliation Engine 602 has a dynamic mapping between software installations and software licenses that is generated dynamically each time that it runs. Because of this "soft" link, it is easy to handle hardware and software decommissions, new installations, and reassigned licensing. Reconciliation Engine 602 simply needs to run in a changed environment to produce a compliant report (Compliance Output 612) based on that environment.

A downside to dynamically assigned reconciliation is that it is difficult to track under-entitlement. Reconciliation Engine 602 handles this by first looking at all licensing constraints that are not based on counting and linking from hardware to entitlement based solely on those constraints. If Reconciliation Engine 602 can't find capacity available in a software license, it is still able to link the installation to a license for recording under/over entitlement.

For example, as shown in Table 1 below, the Software Offering IBM DB2® Enterprise Server Edition License entitles one to install a set of code, namely DB2 Relational Database, DB2 Client, DB2 Connect™ and many more pieces of code. DB2 is a registered trademark and DB2 Connect is a trademark of International Business Machines Corporation. In the catalog, DB2 Relational Database has been marked as base product=yes, used-in-counts=yes. DB2 Client has been marked base product=no, used-in-counts=no. DB2 Connect has been marked as base product=no, used-in-counts=no. The reconciliation engine finds all three pieces of code on a system, locates an offering for IBM DB2 Enterprise Server Edition that is in an active entitlement group. The first rule, or test, applied, the base product rule, is to ensure the existence of a base product on the system. If only the DB2 client or DB2 connect code are found installed, then Reconciliation Engine 602 recognizes that using the IBM DB2 Enterprise Server Edition license would not be appropriate due to not passing the base product rule. The nature of the non-base product is that it is normally licensable on its own and maybe listed as the base product for many other offerings. In this case, because it is installed alongside a base product, its licensing requirements are covered via the base product. The second rule, the used-in-counts rule, directs Reconciliation Engine 602 to determine which of the installed code should drive a reduction in license counts when found to exist on a system. In this case, the existence of only the DB2 Relational Database code would trigger a calculation of licenses needed and a reduction of that amount from the license pool. More complex examples exist that demonstrate that a piece of code should be used-in-counts but not considered a base product.

TABLE 1

| Software Product Name | Base Product | Non-Base Product | Used-in-Counts Product | Not Used-in-Counts Product |
|---|---|---|---|---|
| DB2 Relational Database | X | | X | |
| DB2 Client | | X | | X |
| DB2 Connect | | X | | X |

FIGS. 7, 8 and 9 illustrate one embodiment of Reconciliation Process 700 (FIG. 7) of the present invention, having Linked Entitlement Process 800 (FIG. 8) and Constraint Evaluation Process 900 (FIG. 9). Reconciliation Process 700 begins at 702 and continues to 704 where eligible software installations are obtained from a scanner tool such as IBM Tivoli Monitoring 6.1 software. If there aren't any eligible software installations, Reconciliation Process 700 stops at 708. If there are any eligible software installations, Linked Entitlement Process 800 (FIG. 8) is called to find the entitlement linked to the base product which begins at 802 and continues to 804 where it is determined whether the installation is functional. This may be important because non-functional software generally does not require a license. An installation may be non-functional, for example, if it is a child in a parent-child relationship so has a functional dependency on the parent which may not be installed. If the installation is non-functional, Linked Entitlement Process 800 stops at 806. If the installation is functional, all other installations in that offering and installed on the hardware device are fetched at 808. At 810, it is determined whether there is a base product and, if not, the process loops back to 706 (FIG. 7) and determines if there are any more eligible software installations at 706 and the process continues as discussed above in relation to FIG. 7. If there is a base product at 810, it is determined at 812 whether one or more installations are flagged as "used-in-counts" (i.e., the "used-in-count" attribute is set to "1"). If so, at 816, the license count (i.e., number of entitled installations purchased/licensed) is checked and, if not, the license count is not checked and the Linked Entitlement Process 800 stops at 806.

Returning to Reconciliation Process 700 (FIG. 7), at 712, it is determined whether there are any contracts (counts) left in the selected offering. If not, at 714, no entitlement is reported and the process loops back to 706 where it is determined whether there are any installations left. If there are any contracts (counts) left at 712, at 716, the constraint is reconciled in Constraint Evaluation Process 900 (FIG. 9) which begins at 902 and continues to 904 where it is determined whether there are any non-numeric constraints. A non-numeric constraint may be a physical (hardware) constraint or an environmental constraint. A physical constraint may be that the installation is limited to installations on a particular piece of hardware, such as a single-core processor or a multi-core processor. In the event that it is a multi-core processor, a particular number of independent cores in the processor, e.g., eight (8), may be specified. There are many other examples of physical constraints. An environmental constraint may be that the installation is for use in a development environment or, alternatively, in a staging/production environment. If there are any non-numeric constraints, the constraint is tested against the hardware or environment at 906. This can be done utilizing, e.g., a scanner and look-up tables, and if the installation does not fit the hardware/environment at 908, the installation is flagged and reported as non-matching and Constraint Evaluation Process 900 stops at 912.

If the installation fits the hardware/environment at 908, the process loops back to 904 where it is determined whether there are any more non-numeric constraints and, if not, at 914, the installation is flagged as matching satisfied. At 916, it is determined whether there is a numeric constraint. A numeric constraint may be an installation count. For instance, an offering may allow as certain number of installations (counts) in a particular environment (staging/production) or for a particular piece of hardware (e.g., an 8 core processor). As noted above, certain installations, such as non-functional installations or bundled installations, are not assessed against the licensed installation count. If there is a numeric constraint, at 922, the constraint is tested against the hardware/environment by, i.e., comparing the counts available with the counts used with the hardware and/or in the operating environment and, if the counting constraint fits the hardware/environment licensed count at 924, the process loops back to 916 where it is determined whether there are any more numeric constraints.

If there are no more numeric constraints, at 918, the installation is flagged and reported as counting satisfied and the count consumption amount recorded at 920 and Constraint Evaluation Process 900 stops at 912. If the counting constraint does not fit the hardware/environment licensed count at 924, the installation is flagged as counting not satisfied at 926, the count consumption amount recorded at 920 and Constraint Evaluation Process 900 stops at 912 and returns to Reconciliation Process 700 (FIG. 7), at 718, it is determined whether the counting is satisfied and, if the counting is not satisfied, the installation is reported as installation non-compliant at 720 and it is determined whether matching is satisfied at 722 and, if not, the process loops back to 706 where it is determined whether there are any installations left as discussed above. If matching is satisfied at 722, the installation is added to the consumption amount determined in Constraint Evaluation Process 900 (FIG. 9) to the over/under count data set at 724 and the process loops back to 706 where it is determined whether there are any installations left as discussed above.

If, at 718, it is determined that the counting is satisfied, at 726, it is determined whether the installation is part of a bundle. If the installation is part of a bundle, the remainder of the installations that are part of the bundle are fetched at 728 and added to output (Compliance Report 612 (FIG. 6)). At 730, the available entitlement is reduced by the consumption amount determined in Constraint Evaluation Process 900 (FIG. 9). Likewise, if, at 726, it is determined that the installation is not part of a bundle, the available entitlement is reduced by the consumption amount determined in Constraint Evaluation Process 900 (FIG. 9) at 730. The installation is reported as installation compliant at 732 and the installation is added to the consumption amount determined in Constraint Evaluation Process 900 (FIG. 9) to the over/under count data set at 724.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for determining, collecting and aggregating the reputation of a party from various sources, it is understood that the invention further provides various alternative embodiments. For example, in one embodiment, the invention provides a computer-readable/useable medium that includes computer program code to enable a system for catalog-based software license reconciliation. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.).

In another embodiment, the invention provides a computer-implemented method for catalog-based software license reconciliation. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for determining, collecting and aggregating the reputation of a party from various sources. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of reconciling discovered software programs with software licenses, the method comprising:
   a computer providing a rule-based catalog for mapping an entitled software offering having software programs and associated constraints to installed software programs, at least one constraint comprising an entitled installation count specifying the number of entitled installations of the software programs for the software offering;
   the computer discovering software programs installed on the hardware in the computer environment, the installed software programs each having a base product attribute, a used-in-counts attribute, a parent-child attribute, and at least one of: a physical hardware installation requirement, and a deployment environment requirement, each of the attributes being set or reset;
   the computer identifying an entitled software offering associated with a discovered installed software program and fetching all other installed software programs in the identified software offering;
   the computer determining if one or more of the discovered installed software programs in the identified entitled software offering is a base product based on a base product attribute of the one or the discovered software programs in the identified entitled software offering; and
   the computer determining whether to count the identified entitled software offering against the entitled installation count based on the determination whether one of the discovered installed software programs in the identified entitled software offering is a base product, wherein the identified entitled software offering is determined to not count against the entitled installation count in the case that one or more of the discovered software programs in the identified entitled software offering is not a base product, wherein the identified entitled software offering is determined to count against the entitled installation count in the case that one or more of the discovered software programs in the identified entitled software offering is a base product, and wherein the base product is indicated by the presence of a code artifact that is installed on the hardware and capable of being executed.

2. The method as defined in claim 1 further comprising, wherein one or more of the discovered software programs in the identified entitled software offering is a base product, the computer performing the following:
   determining that the one or more of the discovered software programs in the identified entitled software offering has its used-in-counts attribute set;
   determining if there is a relationship between the discovered software program and the fetched all other installed software programs;
   determining if there are sufficient entitled installations in the entitled installation count to cover the required installation count based upon the relationship determination, which identifies a required installation count; and
   reporting the discovered software programs in the identified entitled software offering in the software offering as one of the following: installation compliant, and installation non-compliant.

3. The method as defined in claim 2 further comprising the computer decreasing the entitled installation count by the number of the one or more of the discovered software programs in the identified entitled software offering having its used-in-counts attribute set further based upon the relationship determination, and recording the discovered software program to a table of processed discovered software programs.

4. The method as defined in claim 2 further comprising:
   the computer determining that there is a non-numeric constraint; and
   testing the non-numeric constraint against the discovered installed software program and its environment or hardware to determine if the discovered installed software program and its environment or hardware fits the non-numeric constraint.

5. The method as defined in claim 3 further comprising, wherein the discovered installed software program and its environment or hardware fits the non-numeric constraint, the computer reporting the discovered installed software program as matching satisfied, and wherein the discovered installed software program and its environment or hardware do not fit the non-numeric constraint, reporting the discovered installed software program as matching not satisfied.

6. The method as defined in claim 5 further comprising;
   the computer determining that there is a numeric constraint coupled with the non-numeric constraint;
   testing the numeric constraint against the discovered installed software program and its environment or hardware to determine if the discovered installed software program and its environment or hardware fits the numeric constraint; and
   reporting the discovered installed software program as one of the following based on the testing: counting not satisfied, and counting as satisfied.

7. The method as defined in claim 2 further comprising:
   the computer determining if the relationship is a bundling of the discovered software program and the fetched all other installed software programs; and
   determining if a bundle is entitled in the identified software offering.

8. The method as defined in claim 2 further comprising the computer determining if the discovered software program is functional, wherein the discovered software program in the required installation count is not used if the discovered software program is not functional.

9. The method as defined in claim 2 further comprising:
   the computer determining that the discovered software program has a parent-child relationship with any of the fetched all other installed software programs; and
   not using the child software program in the required installation count.

10. A computer-readable hardware storage device storing computer instructions, which, when executed, enables a computer system operating with a reconciliation engine, a software license offering catalog, an active hardware database, entitlement constraint database and an installed hardware database for reconciling discovered software programs with entitled software licenses, the computer instructions comprising:

provide a rule-based catalog for mapping an entitled software offering having software programs and associated constraints to installed software programs, at least one constraint comprising an entitled installation count specifying the number of entitled installations of the software programs for the software offering;

discovering software programs installed on the hardware in the computer environment, the installed software programs each having a base product attribute, a used-in-counts attribute, a parent-child attribute, and at least one of: a physical hardware installation requirement, and a deployment environment requirement, each of the attributes being set or reset;

identifying an entitled software offering associated with a discovered installed software program and fetching all other installed software programs in the identified software offering;

determining if one or more of the discovered installed software programs in the identified entitled software offering is a base product based on a base product attribute of the one or the discovered software programs in the identified entitled software offering; and determining whether to count the identified entitled software offering against the entitled installation count based on the determination whether one of the discovered installed software programs in the identified entitled software offering is a base product, wherein the identified entitled software offering is determined to not count against the entitled installation count in the case that one or more of the discovered software programs in the identified entitled software offering is not a base product, wherein the identified entitled software offering is determined to count against the entitled installation count in the case that one or more of the discovered software programs in the identified entitled software offering is a base product, and wherein the base product is indicated by the presence of a code artifact that is installed on the hardware and capable of being executed.

11. The computer-readable hardware storage device as defined in claim 10, the computer instructions further comprising, wherein one or more of the discovered software programs in the identified entitled software offering is a base product:

determining that the one or more of the discovered software programs in the identified entitled software offering has its used-in-counts attribute set;

determining if there is a relationship between the discovered software program and the fetched all other installed software programs;

determining if there are sufficient entitled installations in the entitled installation count to cover the required installation count based upon the relationship determination, which identifies a required installation count; and reporting the discovered software programs in the identified entitled software offering in the software offering as one of the following: installation compliant, and installation non-compliant.

12. The computer-readable hardware storage device as defined in claim 11 further comprising computer instructions for decreasing the entitled installation count by the number of the one or more of the discovered software programs in the identified entitled software offering having its used-in-counts attribute set further based upon the relationship determination, and recording the discovered software program to a table of processed discovered software programs.

13. The computer-readable hardware storage device as defined in claim 11 further comprising computer instructions for:

determining that there is a non-numeric constraint; and testing the non-numeric constraint against the discovered installed software program and its environment or hardware to determine if the discovered installed software program and its environment or hardware fits the non-numeric constraint.

14. The computer-readable hardware storage device as defined in claim 11 further comprising computer instructions for, wherein the discovered installed software program and its environment or hardware fits the non-numeric constraint, reporting the discovered installed software program as matching satisfied, and wherein the discovered installed software program and its environment or hardware do not fit the non-numeric constraint, reporting the discovered installed software program as matching not satisfied.

15. The computer-readable hardware storage device as defined in claim 14 further comprising computer instructions for:

determining that there is a numeric constraint coupled with the non-numeric constraint;

testing the numeric constraint against the discovered installed software program and its environment or hardware to determine if the discovered installed software program and its environment or hardware fits the numeric constraint; and reporting the discovered installed software program as one of the following based on the testing: counting not satisfied, and counting as satisfied.

* * * * *